(12) United States Patent
Park et al.

(10) Patent No.: US 9,264,970 B2
(45) Date of Patent: Feb. 16, 2016

(54) SYSTEM AND METHOD FOR ESTABLISHING SESSION UPON SATISFACTION OF PARTICULAR CONDITIONS

(75) Inventors: Sung-jin Park, Suwon-si (KR); Kyung-tak Lee, Yongin-si (KR); Seung-yong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 13/263,902

(22) PCT Filed: Apr. 9, 2010

(86) PCT No.: PCT/KR2010/002213
§ 371 (c)(1),
(2), (4) Date: Oct. 11, 2011

(87) PCT Pub. No.: WO2010/117243
PCT Pub. Date: Oct. 14, 2010

(65) Prior Publication Data
US 2012/0042026 A1    Feb. 16, 2012

(30) Foreign Application Priority Data

Apr. 10, 2009  (KR) .................. 10-2009-0031480

(51) Int. Cl.
*G06F 15/16*   (2006.01)
*H04W 36/38*   (2009.01)
(Continued)

(52) U.S. Cl.
CPC ......... *H04W 36/385* (2013.01); *H04L 12/1818* (2013.01); *H04L 12/5815* (2013.01); *H04L 67/24* (2013.01)

(58) Field of Classification Search
CPC .................. H04L 29/08576; H04L 29/08675; H04L 12/5815; H04L 67/24
USPC .................................. 709/203, 204, 205, 206
See application file for complete search history.

(56) References Cited

U.S. PATENT DOCUMENTS 8,234,335 B1 *  7/2012  Haldar ................ H04L 65/4061
                                                  709/204
2006/0035656 A1  2/2006  Sung et al.
(Continued)

FOREIGN PATENT DOCUMENTS

| CN | 101103647 | 1/2008 |
| KR | 1020090009880 | 1/2009 |

OTHER PUBLICATIONS

PCT/ISA/237 Written Opinion issued on PCT/KR2010/002213 (3 pp.).

(Continued)

*Primary Examiner* — Dhairya A Patel
(74) *Attorney, Agent, or Firm* — The Farrell Law Firm, P.C.

(57) ABSTRACT

A method and apparatus is provided for establishing a session upon satisfaction of particular conditions in a messaging service system such as SIMPLE Instant Messaging (IM), Push to talk over Cellular (PoC), and Converged IP Messaging) (CPM) services, in which a client provides particular conditions to a server separately for a predefined group session, an Ad-hoc group session and a one-to-one session, and the server establishes a session to the pertinent members upon satisfaction of the particular conditions. By doing so, a session reflecting particular conditions set by the client is established in the SIP-based system, thereby offering further differentiated messaging services.

14 Claims, 8 Drawing Sheets

(51) Int. Cl.
*H04L 12/58* (2006.01)
*H04L 12/18* (2006.01)
*H04L 29/08* (2006.01)

(56) References Cited

U.S. PATENT DOCUMENTS

| | | | | |
|---|---|---|---|---|
| 2006/0069726 | A1* | 3/2006 | McKibben | H04L 29/06027 709/204 |
| 2006/0084454 | A1 | 4/2006 | Sung et al. | |
| 2006/0172753 | A1 | 8/2006 | Sung et al. | |
| 2006/0235981 | A1* | 10/2006 | Westman | H04L 12/185 709/227 |
| 2007/0127505 | A1* | 6/2007 | Laurila | H04L 12/189 370/400 |
| 2007/0208809 | A1* | 9/2007 | Westman | H04W 4/06 709/205 |
| 2007/0276947 | A1* | 11/2007 | Panattu | H04L 65/4061 709/227 |
| 2008/0003999 | A1 | 1/2008 | Sung et al. | |
| 2008/0112567 | A1* | 5/2008 | Siegel | H04R 1/10 381/58 |
| 2008/0113679 | A1* | 5/2008 | Sung | H04L 12/5835 455/466 |
| 2008/0117839 | A1* | 5/2008 | Raju | H04L 12/1813 370/261 |
| 2008/0120692 | A1* | 5/2008 | Gupta | H04L 67/24 726/1 |
| 2008/0155029 | A1* | 6/2008 | Helbling | G06Q 10/107 709/206 |
| 2009/0094367 | A1* | 4/2009 | Song | H04L 12/1818 709/227 |
| 2009/0204673 | A1* | 8/2009 | Tian | H04L 12/1822 709/204 |

OTHER PUBLICATIONS

PCT/ISA/210 Search Report issued on PCT/KR2010/002213 (3 pp.).
Korean Office Action dated Apr. 28, 2015 issued in counterpart application No. 10-2009-0031480.

* cited by examiner

```
PUT /org.openmobilealliance.groups/users/
    sip:ronald.underwood@example.com/MyGroup.xml HTTP/1.1
Host: xcap.example.com
...
Content-Type: application/groups+xml ; charset="utf-8"
Content-Length: (...)

<?xml version="1.0" encoding="UTF-8"?>
<group xmlns="urn:oma:xml:poc:list-service"
    xmlns:rl="urn:ietf:params:xml:ns:resource-lists"
    xmlns:cr="urn:ietf:params:xml:ns:common-policy"
     xmlns:oxe="urn:oma:xml:xdm:extensions">

<list-service uri="sip:mygroup@example.com">
    <list>
        <entry uri="tel:+1-212-555-1234"/>
        <entry uri="sip:hermione.blossom@example.com"/>     ~900
        <entry uri="sip:bob@example.com"/>
        <entry uri="sip:alice@example.com"/>
    </list>
    <scheduled conference>
        <trigger type="time">
            <clock>GMT:2008-10-10 12:30:00</clock>   ~920
        </trigger>                                            ~910
        <trigger type="presence">
            <entri URI="sip:bob@example.com"/> or
                                                  ~930
            <active="true"/>
        </trigger>
    </scheduled conference>
</list-service>
</group>
```

Fig. 10

INVITE mygroup@example.com SIP/2.0
Max-Forwards: 70
To: Mygroup <sip:mygroup@example.com>
From: Joshua <sip:clientA@example.com>;tag=49583
Call-ID: a8462e739
Cseq: 314159 INVITE
Require: scheduled-conf-apply    ~10
Contact: <clientA@pc33.example.com>;scheduled-conf    ~20
Content-Type: application/sdp <Joshua's SDP not shown>

Fig. 11

INVITE sip:conf-fact@example.com SIP/2.0
...
To: "Conf-factory"  <sip:conf-fact@domain.com>
From: Joshua <sip:clientA@example.com>
Require: scheduled-conf-apply
Contact: <sip:clientA@pc33.example.com>;scheduled-conf
...
Content-Type:multiparts/mixed;boundary='boundary1'
...
--boundary1
Content-Type:application/resource-list+xml
...
--
boundary1
Content-Type:application/scheduled-conf-condition+xml <?xml version="1.0" encoding="UTF-8"?>
<scheduled-conference xmlns="urn:ietf:params:xml:ns:scheduled-conf">
  <scheduled conference>
    <trigger type="time">
      <clock>GMT:2008-10-10 12:30:00</clock>
    </trigger>
  </scheduled conference>
</scheduled-conf>

REFER mygroup@example.com SIP/2.0
Max-Forwards: 70
To: Mygroup <sip:mygroup@example.com>
From: Joshua <sip:clientA@example.com>;tag=49583
REFER-To: Mygroup <sip:mygroup@example.com>    ~12
Call-ID: a8462e739
Cseq: 3123 REFER
Event: refer    ~22
Require: scheduled-conf-apply    ~32
Contact: <clientA@pc33.example.com>;scheduled-conf    ~42
Content-Type: application/sdp <Joshua's SDP not shown>

Fig. 13

```
REFER sip:conf-fac@example.com SIP/2.0
...
To: "Conf-factory"  <sip:conf-fac@example.com>
From: Joshua <sip:clientA@example.com>
REFER-To: "Conf-factory"  <sip:conf-fact@example.com>
Event: refer
Require: scheduled-conf-apply
Contact: <sip:clientA@pc33.example.com>;scheduled-conf
...
Content-Type:multiparts/mixed;boundary="boundary1"
...
--boundary1
Content-Type:application/resource-list+xml
...
--
boundary1
Content-Type:application/scheduled-conf-condition+xml <?xml version="1.0" encoding="UTF-8"?>
<scheduled-conference xmlns="urn:ietf:params:xml:ns:scheduled-conf">
  <scheduled conference>
    <trigger type="time">
      <time>GMT:2008-10-10 12:30:00</time>
    </trigger>
  </scheduled conference>
</scheduled-conf>
```
~13

SYSTEM AND METHOD FOR ESTABLISHING SESSION UPON SATISFACTION OF PARTICULAR CONDITIONS

TECHNICAL FIELD

The present invention relates generally to a system and method for establishing a session in a Session Initiation Protocol (SIP)-based messaging service environment, and more particularly, to a system and method for establishing a session upon satisfaction of particular conditions.

BACKGROUND ART

Figure 1:
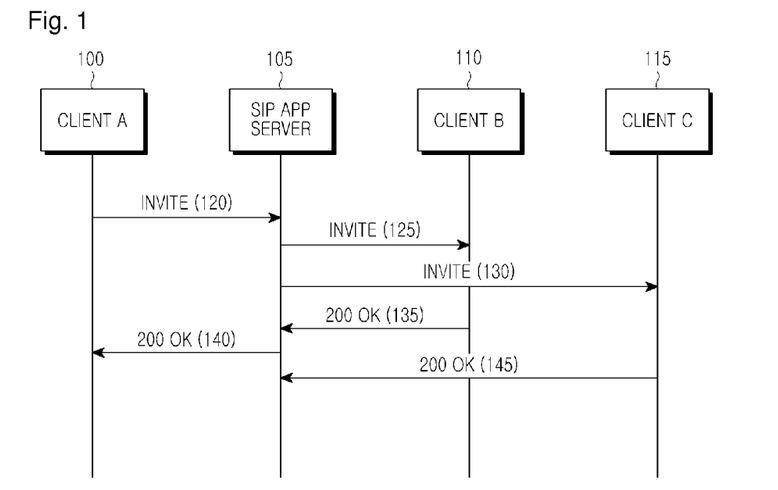
FIG. 1 is a message flow diagram for providing the conventional group messaging service.

In the SIP-based common messaging system, a session creation method for providing a group messaging service is classified mainly depending on a one-to-one session, an Ad-hoc group session, and a predefined group session. A process of creating the Adhoc group session among these sessions will be described with reference to FIG. 1. Referring to FIG. 1, clients, which are SIP application-based clients that are mounted in user terminals and are responsible for a messaging service, allow users to access the messaging service and serve to create/modify/terminate an SIP session.

To describe a process of establishing a session between multiple clients, it is assumed in FIG. 1 that a client A 100 requests a client B 110 and a client C 115 to establish an Ad-hoc group messaging session. In step 120, the client A 100 generates an INVITE message and sends it to an SIP application server (App Server) 105. The INVITE message may include information about clients to be invited. For example, the client A 100, which applies a conference factory Uniform Resource Identifier (URI) to a Request URI value in an INVITE message, transmits its desired media and session information using the conference factory URI. Therefore, if the Request URI in the INVITE message corresponds to a conference factory URI, the server 105 performs a conference function and a participating function. Accordingly, the server 105 establishes and manages an Ad-hoc group messaging session based on the INVITE message sent by the client A 100.

In steps 125 and 130, the server 105 sends INVITE messages including the media and session information desired by the client A 100 to the client B 110 and the client C 115. After receiving the INVITE messages, the client B 110 and the client C 115 can respond depending on the users' decisions. When accepting a call with the client A 100, the client B 110 and the client C 115 send 200 OK messages with their desired media response information to the server 105 in step 135 or 145. In response, the server 105 sends a 200 OK message to the client A 100 in step 140.

A one-to-one session is established by requesting one member to participate in the session in an Ad-hoc group session establishment method and procedure. Therefore, a one-to-one session establishment method and procedure is identical to the Ad-hoc group session establishment method and procedure.

For establishment of a predefined group session, information about a predefined group is used. Accordingly, upon receiving a session establish request message for a predefined group from a client, the server 105 sends a session establish request message to each member in a group member list acquired by performing a process of acquiring the group member list.

DISCLOSURE OF INVENTION

Technical Problem

The SIP-based system can offer group member list-based messaging services, but does not support messaging services in which users directly set their participation conditions and which are based on the conditions.

As described above, conventionally, if a session establish request message is sent from the client to the server, the server determines participating group members and then immediately sends session establish request messages to the determined group members, thereby simply establishing the session. However, further differentiated messaging services may be provided, if it is possible to establish a session reflecting particular conditions set by the client in the SIP-based system.

Solution to Problem

An aspect of the present invention is to address at least the above-mentioned problems and/or disadvantages and to provide at least the advantages described below. Accordingly, an aspect of the present invention provides a system and method for establishing a session reflecting particular conditions set by a client.

Another aspect of the present invention provides a system and method for establishing a session upon satisfaction of a preset possible participation time in an SIP-based messaging service environment.

In accordance with one aspect of the present invention, there is provided a method for establishing a session upon satisfaction of particular conditions for a messaging service in a server, in which the server receives a message for requesting establishment of a scheduled conference session, acquires a group member list and scheduled conference information from the message, checks session establishment conditions based on the acquired information, and sends a session establish request message to at least one receiving client corresponding to the group member list upon satisfaction of the session establishment conditions.

In accordance with another aspect of the present invention, there is provided a messaging service system for establishing a session upon satisfaction of particular conditions, in which a transmitting client requests a shared XDMS to store a group member list and scheduled conference information, and sends a message for requesting establishment of a scheduled conference session to a server, the shared XDMS stores the group member list and scheduled conference information on request from the transmitting client, and the server acquires the group member list and scheduled conference information from the shared XDMS upon receiving the message from the transmitting client, checks session establishment conditions based on the acquired information, and sends a session establish request message to at least one receiving client corresponding to the group member list upon satisfaction of the session establishment conditions.

Advantageous Effects of Invention

According to exemplary embodiments of the present invention, session establishment is possible when particular conditions are satisfied in the SIP-based messaging service environment, such as SIMPLE Instant Messaging (IM), Push to talk over Cellular (PoC), and Converged IP Messaging (CPM) services. In addition, the client can receive a messaging service reflecting its taste by directly setting particular conditions, enabling more efficient messaging services.

BRIEF DESCRIPTION OF DRAWINGS

The above and other aspects, features and advantages of certain exemplary embodiments of the present invention will be more apparent from the following description taken in conjunction with the accompanying drawings, in which:

FIG. 10 is a diagram showing an example of an INVITE message for a predefined group according to an embodiment of the present invention;

FIG. 11 is a diagram showing an example of an INVITE message for an Ad-hoc group according to an embodiment of the present invention;

FIG. 12 is a diagram showing an example of a REFER message for a predefined group according to an embodiment of the present invention.

Throughout the drawings, the same drawing reference numerals will be understood to refer to the same elements, features and structures.

MODE FOR THE INVENTION

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention provides a method and procedure for establishing a session upon satisfaction of particular conditions in a messaging service system such as a SIMPLE Instant Messaging (IM) service, a Push to talk over Cellular (PoC) service, and a Converged IP Messaging (CPM) service. To this end, for each of a predefined group session, an Ad-hoc group session, and a one-to-one session, the present invention includes a process in which a client provides particular conditions to a server, and a process in which the server establishes a session to a related member upon satisfaction of the particular conditions. By doing so, an SIP-based system establishes a session reflecting particular conditions set by a client, thereby providing further differentiated messaging services.

Prior to describing the present invention, a core network using a Session Initiation Protocol (SIP) and an Internet Protocol (IP), and an SIP-based messaging service environment using SIP application clients (hereinafter "clients") and an SIP application server (PF/CF) (hereinafter a "server") will first be described, and based thereon, a background technology for a method of creating a one-to-one session, an Ad-hoc group session and a predefined group session in an SIP-based messaging service will be described.

Components of an SIP-based messaging service system according to the present invention and the system operation for providing a group messaging service will be described with reference to FIG. 2.

Figure 2:
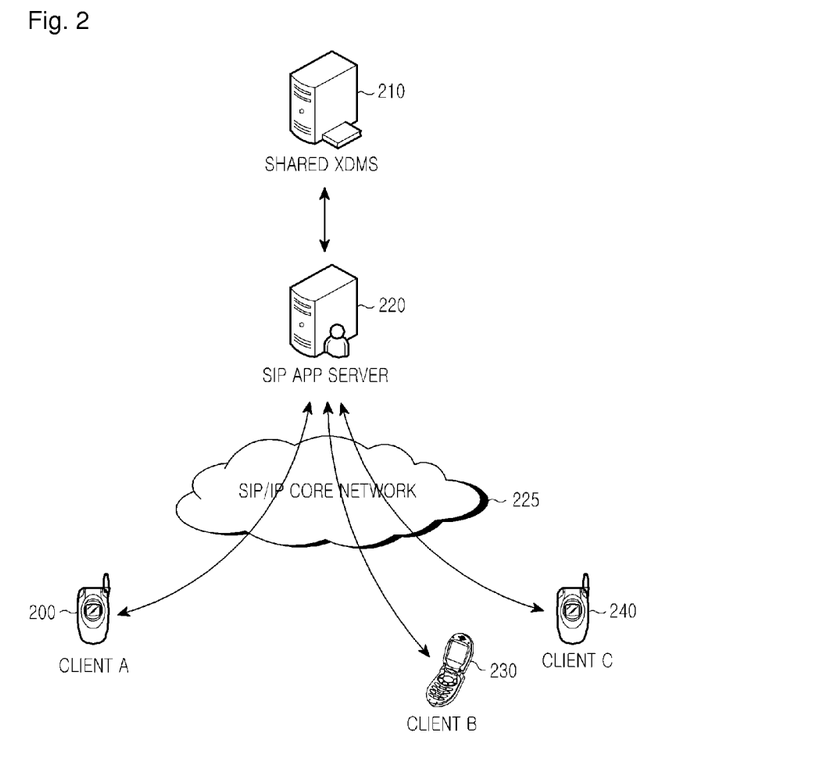
FIG. 2 is a diagram showing a configuration of a system providing a group messaging service according to an embodiment of the present invention.

Referring to FIG. 2, clients A, B and C 200, 230 and 240 allow users to access a messaging service, and serve to create/modify/terminate an SIP session. If the client A 200 intends to establish an Ad-hoc group session, it establishes a session by sending a session establish request message with a conference factory URI and a group member list to a server 220.

If the client A 200 desiring to establish a predefined group session sends a session establish request message with a group URI to the server 220, then the server 200 establishes the session by acquiring a group member list and a group policy corresponding to the group URI from a shared XML Document Management Server (XDMS) 210. In the present invention, an SIP INVITE message is used as the session establish request message.

A method in which a client establishes a messaging session has been described so far in brief. While the SIP-based system can provide group member list-based messaging services, the present invention provides the following method to establish a session upon satisfaction of participation conditions that a user has directly set. Although a method and procedure for establishing a session upon satisfaction of particular conditions is to be proposed by the present invention, a method and procedure of establishing a session upon satisfaction of particular time and/or presence conditions will be described in detail for clarification. To be specific, while particular time information set by a user, such as a scheduled time, a conference time and an anniversary, and presence information are considered examples of the particular conditions in the present invention, the particular conditions may be extended to various other conditions such as media capability without being limited to the above particular conditions.

In the case of an Ad-hoc group session, in order to establish the session upon satisfaction of particular conditions, particular conditions set by the user are additionally inserted into a session establish request message being sent to the server 220 according to an embodiment of the present invention. Then the server 220 determines whether the particular conditions are satisfied by analyzing the received session establish request message, and establishes the session to group members if the particular conditions are satisfied.

In the case of a predefined group session, the client A 200 creates particular conditions in the form of an Extensible Markup Language (XML) document in advance using an XML document composer, and then transmits them to the shared XDMS 210 using an XCAP PUT command. By doing so, the client A 200 requests the shared XDMS 210 to store the particular conditions. In response, the shared XDMS 210 shares the particular conditions. Thereafter, the client A 200 sends the server 220 a session establish request message including a parameter requesting a scheduled conference. Upon recognizing the request, the server 220 acquires group information and particular conditions from the shared XDMS 210, and then establishes a session to the pertinent group members when the particular conditions are satisfied.

An SIP/IP core network 225 takes charge of routing between the clients and the server to support the above messaging services. If a client registers its ID in SIP/IP to enjoy a messaging service, the SIP/IP core network 225 stores information about the client based on the client's request. For more details, reference can be made to IETF RFC 3261 SIP.

The server 220 serves to maintain overall an SIP session for transmitting and receiving messages between a transmitting client and a receiving client, and to take charge of creating/maintaining/terminating a session of one client. Generally, a conference function or a controlling function is performed in the server that serves to maintain a group session created with participations of several clients, and a function managing a session of one client is called a participating function.

A function of the shared XDMS 210 is a kind of an address book. In an embodiment of the present invention, the shared XDMS 210 is a kind of a group management server. The shared XDMS 210 stores XML documents composed of information about a predefined group, a contact list, a user access policy, a user profile, etc. In a predefined group document are written (i) a unique URI and a member list by which a group can be identified, (ii) an authentication mechanism for users, capable of acquiring group information, and (iii) a group policy. Especially, scheduled conference information is additionally written in the predefined group document as particular conditions for session establishment according to an embodiment of the present invention, and examples of the scheduled conference information may include a particular time, On/Off presence information, etc.

Exemplary embodiments of the present invention will be separately described as follows. A first embodiment of the present invention, considering a predefined group, includes a process in which a client transmits scheduled conference information indicating desired particular conditions for session establishment to a shared XDMS, and then sends a server a session establish request message with an identifier indicating the request of the scheduled conference, and the server acquires a group member list and scheduled conference information from the shared XDMS upon receiving the session establish request message, and then establishes a session to the pertinent members when particular conditions corresponding to the scheduled conference information are satisfied. A second embodiment of the present invention, considering an Ad-hoc group, includes a process in which if a client sends a session establish request message with particular conditions to a server, then the server acquires a group member list and the particular conditions from the received session establish request message and then establishes a session to the pertinent members when the particular conditions are satisfied. A third embodiment of the present invention considers the case where a REFER message is used instead of the session establish request message, when no session has been connected.

First, a session establishment process for a predefined group according to the first embodiment of the present invention will be described with FIG. 3.

Figure 3:
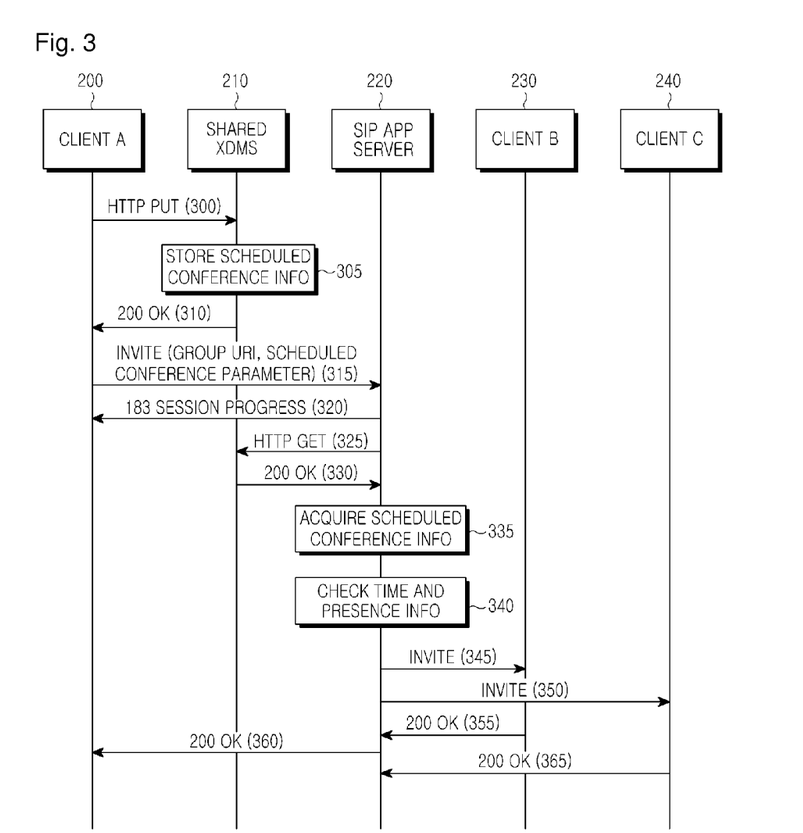
FIG. 3 is a message flow diagram showing a session establishment process for a predefined group according to a first embodiment of the present invention.

Referring to FIG. 3, the shared XDMS 210 is used for a predefined group session. The shared XDMS 210 serves to previously store information about the predefined group and particular conditions for session establishment. To provide this information to the shared XDMS 210 in advance, the client A 200 sends an HTTP PUT command to the shared XDMS 210 in step 300. To be specific, the client A 200 creates its desired conditions for session establishment, e.g., particular time and/or presence information, in an XML document using an XML document composer, and then transmits the conditions to the shared XDMS 210 using an XCAP PUT command.

Figure 9:
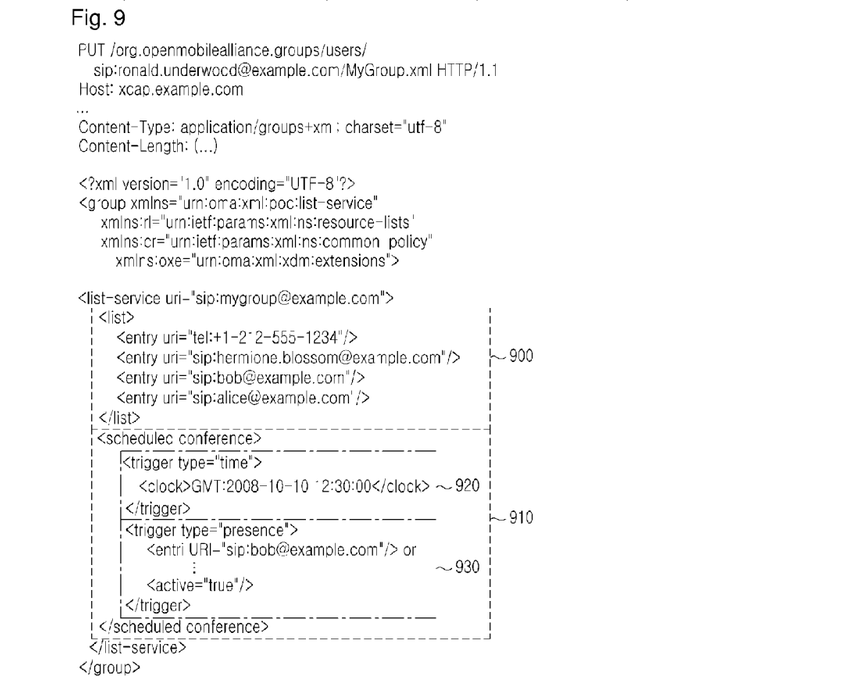
FIG. 9 is a diagram showing an example of an HTTP PUT command used in the present invention.

An example of the created HTTP PUT command is as shown in FIG. 9. An XML document of FIG. 9 includes a group URI 900 and scheduled conference information 910, which is one of the elements. The scheduled conference information 910 indicates particular conditions for session establishment, and the particular conditions may include a scheduled session establishment time, presence information indicating On/Off of the other party, etc. An example in which a scheduled session establishment time part 920 and a presence information part 930 are composed in the scheduled conference information 910 is shown in FIG. 9. The scheduled session establishment time may be specified as "GMT 2008-10-10 12:30:00" as indicated by reference numeral 920, and when it is desired to insert the presence information as other conditions, the part indicated by reference numeral 930 may be additionally written following the scheduled time 920. A sub-element should be described in detail to establish a session according to the presence state. For example, "clock" is used as the sub-element and its time is represented as "GMT 2008-10-10 12:30:00" in the scheduled time part 920 of FIG. 9. Describing the presence information part 930, this part 930 means the condition to establish a session if a member called "sip:bob@example.com" among the members corresponding to the group URI 900 is in an On state, or becomes "true".

Upon receiving the HTTP PUT command, the shared XDMS 210 stores scheduled conference information in step 305, and sends a 200 OK message to the client A 200 to inform the successful storage in step 310.

The client A 200 sends an INVITE message or a session establish request message to the server 220 in step 315. The INVITE message includes a group URI, and a scheduled conference parameter or a parameter requesting establishment of a scheduled session. An example of this INVITE message is as shown in FIG. 10. Regarding a Require header 10 of the INVITE message in FIG. 10, a "Require:scheduled-conf-apply" parameter means that the server 220 should support the scheduled conference to create the session. As to a Contact header 20, a "scheduled-conf" parameter means that the client A 200 requests establishment of the scheduled conference session.

Upon receiving the INVITE message, the server 220 checks the request and sends the client A 200 a 183 Session Progress message indicating its intention to establish the subsequent scheduled session in step 320. If there is no "scheduled-conf" parameter in the received INVITE message or if there is no "scheduled-conf-apply" parameter in the Require header 10, then the server 220 may immediately send the INVITE message to the receiving participants in the predefined group even though scheduled conference information is contained in predefined group information.

If the INVITE message with the Require header is received, the server 220 acquires scheduled conference information along with a group member list from the shared XDMS 210. To do so, the server 220 sends an HTTP GET command or an XCAP GET command to the shared XDMS 210 in step 325. The server 220 receives a 200 OK message in step 330, after it requests the shared XDMS 210 to provide the above information, using the HTTP GET command. In step 335, the server 220 acquires, from the received 200 OK message, group information corresponding to the group URI, for example, a group member list, a group policy, scheduled conference information and the like.

Subsequently, the server 220 checks time information and/or presence information based on the scheduled conference information acquired from the shared XDMS 210 in step 340, to perform the operation requested by the "scheduled-conf" parameter in the received INVITE message. In the situation where the checked time and/or presence information are satisfied, the server 220 sends an INVITE message to the receiving participants in the predefined group for session establishment. Accordingly, the server 220 sends INVITE messages to the client B 230 and the client C 240 in steps 345 and 350. In response, the server 220 receives 200 OK messages sent by the receiving participants in steps 355 and 365. Upon receiving a first one of the 200 OK messages, the server 220 sends a 200 OK response message to the client A 200 that requested the session establishment, in step 360.

When not much time is left until the scheduled time, it doesn't matter if the client A 200 continuously maintains a session establishment dialog state. However, when it is necessary to wait for a long time until the scheduled time, it is preferable that the client A 200 first terminates the session and then all clients establish again the session together at the scheduled time. Considering this, the present invention provides a process of determining whether the scheduled time is behind a predetermined time as in FIG. 4. Since steps 400 to 435 in FIG. 4 are equal in operation to steps 300 to 335 in FIG. 3, a detailed description thereof will be omitted.

Figure 4:
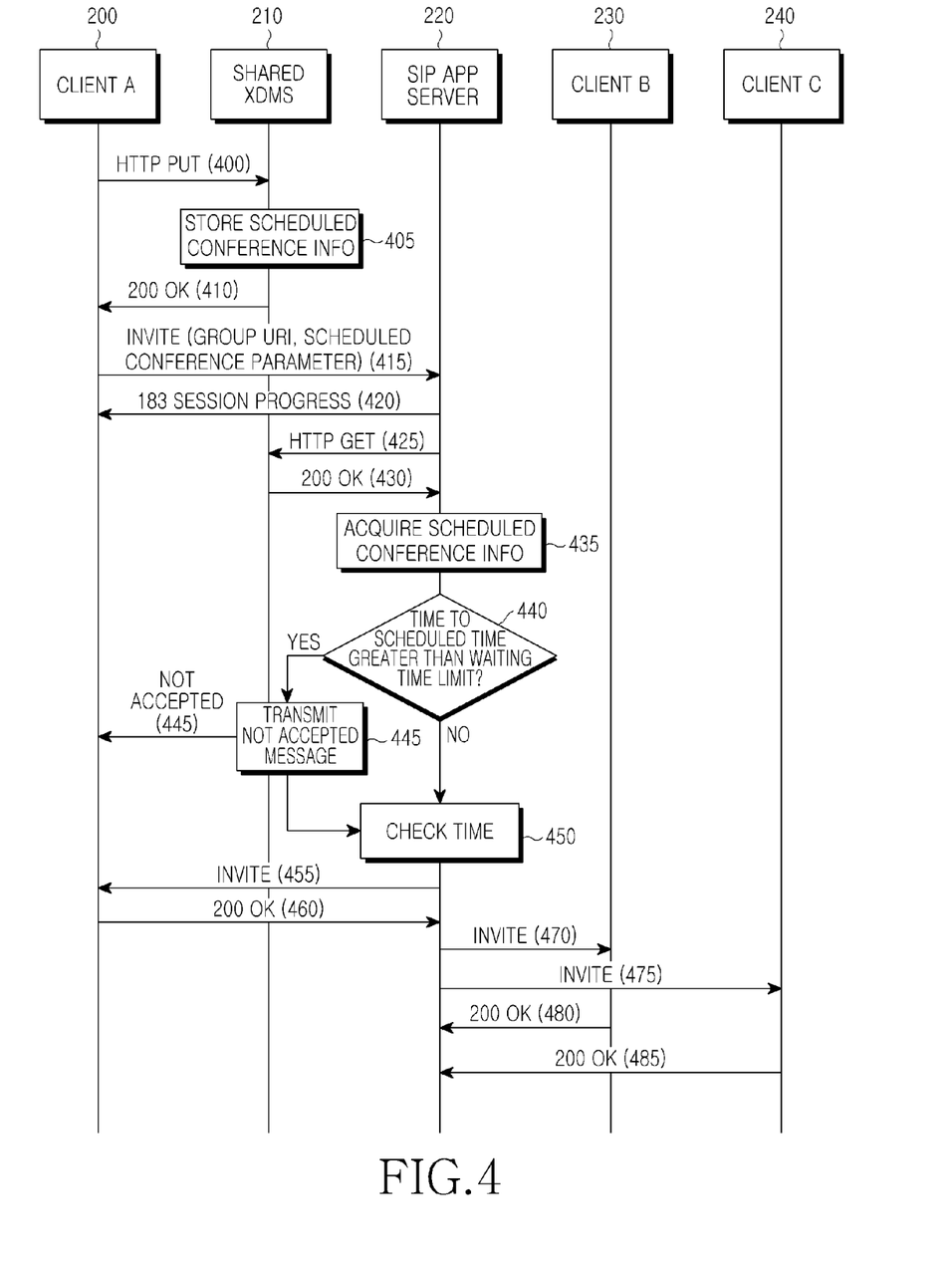
FIG. 4 is a message flow diagram showing a modified session establishment process for a predefined group according to the first embodiment of the present invention.

In FIG. 4, after acquiring the scheduled conference information, the server 220 determines in step 440 whether the time to the scheduled time is greater than a predetermined waiting time limit. If the time to the scheduled time is greater than the waiting time limit, i.e., if it is necessary to wait for a long time until the scheduled time, the server 220 sends a Not Accepted message to the client A 200 in step 445. The Not Accepted message is used to indicate the necessity of waiting for a long time until the scheduled time and instruct to exit the current session establishment dialog state.

The server 220 checks the time in step 450, and if the scheduled time arrives, the server 220 sends INVITE messages to the clients 200, 230 and 240 in the group member list in step 455, 470 and 475. Subsequently, the server 220 receives 200 OK messages in response to the INVITE messages in steps 460, 480 and 485, thereby establishing a session.

Figure 5:
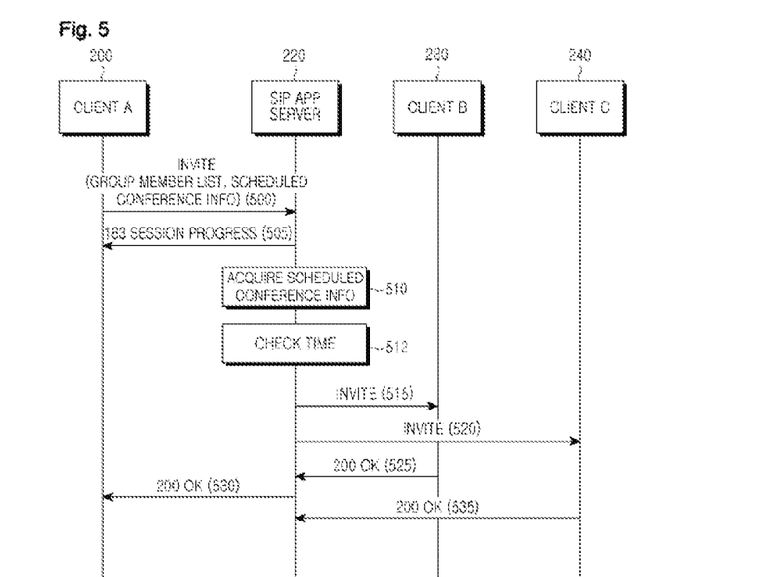
FIG. 5 is a message flow diagram showing a session establishment process for an Ad-hoc group according to a second embodiment of the present invention.

A session establishment process for an Ad-hoc group according to the second embodiment of the present invention will be described with reference to FIG. 5. A one-to-one session can be established by requesting one member to participate in the session in the Ad-hoc group session establishment method and procedure. Therefore, the one-to-one session establishment method and procedure will be described herein in conjunction with an Ad-hoc group, since it is equal to the Ad-hoc group session establishment method and procedure. The second embodiment of the present invention includes sending by a client a session establish request message with a group member list and scheduled conference information to a server, checking specific conditions based on the scheduled conference information by the server until they are satisfied, and sending session establish request messages to group members upon satisfaction of the particular conditions.

To be specific, the client A 200 sends an INVITE message to the server 220 in step 500, the INVITE message including a list of participants to be invited in the session, i.e., a group member list, and scheduled conference information indicating particular conditions. An example of the INVITE message is as shown in FIG. 11. Referring to FIG. 11, a conference factory URI is inserted into a Request URI to indicate that the session to be established is a scheduled conference session. The related SIP headers and resource list content type have already been described, so parameters of a Require header and a Contact header, and a new Content-Type header will be described herein. A "scheduled-conf-apply" parameter of the Require header and a "scheduled-conf" parameter of the Contact header are equal to those described in the first embodiment of the present invention, in which the shared XDMS 210 is used.

However, in the second embodiment of the present invention, a scheduled conference information part 11 may be additionally included in the INVITE message as shown in FIG. 11. "Content-Type: application/scheduled-conf-condition+xml" in the part 11 is written in the XML form to provide the scheduled time. While only the scheduled time for which a trigger type is represented as "time" is written in the scheduled conference information part 11, the presence information may be added after the scheduled time as shown in FIG. 9, and various other particular conditions may also be added. That is, the session may be established according to the presence state by representing the trigger type as "presence."

Upon receiving the INVITE message shown in FIG. 11, the server 220 sends the client A 200 a 183 Session Progress message indicating its intention to proceed with the scheduled session establishment in step 505, understanding the meaning of "scheduled-conf-apply" in the Require header and "scheduled-conf" in the Contact header. The server 220 acquires the scheduled conference information from the INVITE message in step 510, in order to perform an operation requested by the "scheduled-conf" parameter in the Contact header of the received INVITE message. The server 220 checks a scheduled time of the acquired information in step 512, and if the scheduled time arrives, the server 220 sends INVITE messages to the receiving participants in the group member list, for example, to the client B 230 and the client C 240, in steps 515 and 520. The server 220 receives 200 OK messages in steps 525 and 535, and sends a 200 OK message to the client A 200 in step 530. Upon receiving a first one of the 200 OK messages sent by the receiving participants, the server 220 sends a 200 OK response message to the client A 200 that requested establishment of the scheduled conferment session.

Figure 6:
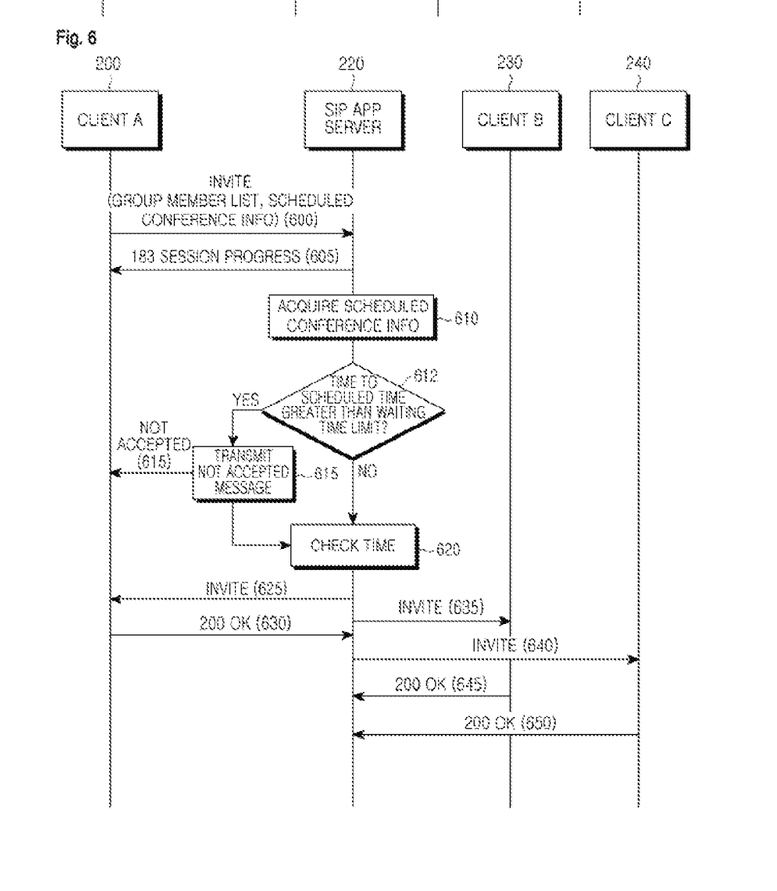
FIG. 6 is a message flow diagram showing a modified session establishment process for an Ad-hoc group according to the second embodiment of the present invention.

Even in the case of the Ad-hoc group session, if it is necessary to wait for a long time until the scheduled time, it is preferable that all clients establish again the session together at the scheduled time after the client A 200 first terminates the session. Taking this into consideration, reference will be made to FIG. 6, in order to determine how the operation will be performed when the scheduled time is behind a predetermined waiting time. Since steps 600 to 610 in FIG. 6 are equal in operation to steps 500 to 510 in FIG. 5, a detailed description thereof will be omitted.

In step 612, the server 220 determines whether the time of the scheduled time is greater than a predetermined waiting time limit. If it is necessary to wait for a long time until the scheduled time, the server 220 sends a Not Accepted message to the client A 200 in step 615. An operation in steps 615 to 650, including sending the Not Accepted message, is the same as the operation in steps 445 to 485 of FIG. 4, so a detailed description thereof will be omitted.

Figure 7:
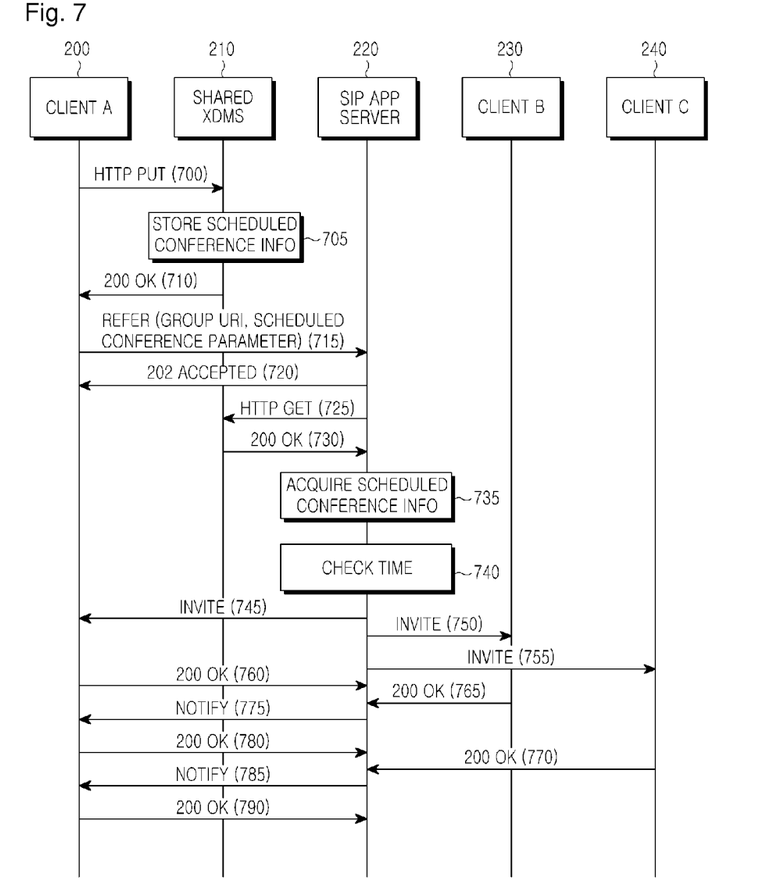
FIG. 7 is a message flow diagram showing a process of establishing a scheduled conference session for a predefined group using a REFER message according to a third embodiment of the present invention.

While it has been described that the client A 200 uses the INVITE message as a session establish request message in the first and second embodiments of the present invention, a REFER message may also be used. When the REFER message is used, the client A 200 has no need to continuously maintain the session establishment dialog state until the scheduled conference session is actually established. A process of establishing a scheduled conference session using the REFER message will be described with reference to FIG. 7. The REFER message can be used in each of a predefined group session, a one-to-one session, and an Ad-hoc group session. FIG. 7 shows an example of the case where a REFER message is used in the predefined group session.

Referring to FIG. 7, the client A 200 provides scheduled conference information to the shared XDMS 210 using an HTTP PUT command and the shared XDMS 210 stores the information in steps 700 to 710, which is equal to the operation in steps 300 to 310 in FIG. 3. However, the client A 200 sends the server 220 a REFER message with a group URI and a scheduled conference parameter. The scheduled conference parameter serves to indicate that the REFER message is a message for requesting a scheduled conference.

The REFER message is as shown in FIG. 12. Referring to FIG. 12, the REFER message is equal to the INVITE message of FIG. 10 except that a REFER-To header 12 and an Event header 22 are added. A Request URI value in the REFER message includes an SIP URI of the other party receiving the REFER message, and the REFER-To 12 should include a URI of the other party receiving the INVITE message. In this embodiment of the present invention, since the other party receiving the REFER message is an SIP application server that should establish a group conference session called "Mygroup," the same group URI called "mygroup@example.com" is used. The REFER-To 12 indicates that the entities actually receiving the INVITE message are participants in the member list in the "mygroup@example.com" group. Parameters of a Require header 32 and a Contact header 42 have the same meaning as described above. "refer" in the Event header 22 means that the server 220 is instructed to send a Notify message to the transmitting client that sent the REFER message, upon receiving responses to the INVITE messages from the receiving participants.

Upon receiving the REFER message, the server 220 sends a 202 Accepted message in response to the REFER message in step 720. The 202 Accepted message serves to report the progress of the scheduled conference session. Therefore, after receiving the 202 Accepted message, the client A 200 maintains the current state until it receives an INVITE message from the server 220, recognizing that the session will be progressed.

The server 220 performs steps 725 to 735, or a process for acquiring scheduled conference information, and this is equal to that in steps 425 to 435 of FIG. 4. After acquiring scheduled conference information through this process, the server 220 checks time based on the acquired information in step 740 to determine whether the scheduled time has arrived. Upon arrival of the scheduled time, the server 220 sends INVITE messages to the clients 230 and 240 in the group member list in steps 745 to 755. The server 220 should instruct even the client A 200 to participate in the session. To do so, the server 220 sends an INVITE message to the client A 200 referring to a From header in the REFER message in step 745.

Upon receiving the INVITE message, the client A 200 participates in establishing the scheduled conference session by sending a 200 OK message to the server 220 in response to the receive INVITE message in step 760. Upon receiving a 200 OK message from the client B 230 in step 765, the server 220 understands that the 200 OK message indicates that the client B 230 intends to participate in the scheduled conference session. Then the server 220 notifies that the client B 230 has participated in the session, by sending a NOTIFY message to the client A 200 in step 775. Likewise, upon receiving a 200 OK message from the client C 240 in step 770, the server 220 notifies the session participation of the client C 240 by sending a NOTIFY message to the client A 200 in step 785. Upon receiving these NOTIFY messages, the client A 200 sends 200 OK messages to the server 220 to inform the server 220 of its successful receipt of the NOTIFY messages in steps 780 and 790.

Figure 8:
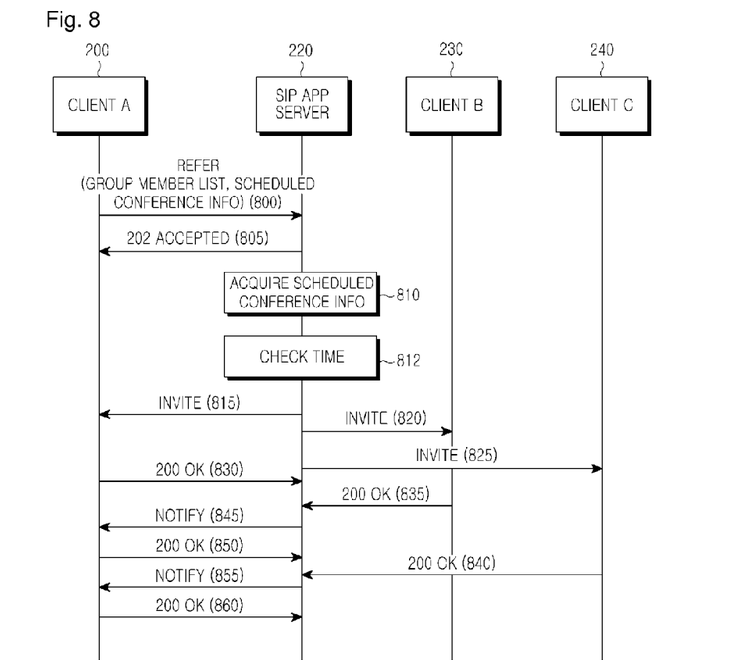
FIG. 8 is a message flow diagram showing a process of establishing a scheduled conference session for an Ad-hoc group using a REFER message according to the third embodiment of the present invention.
Figure 13:
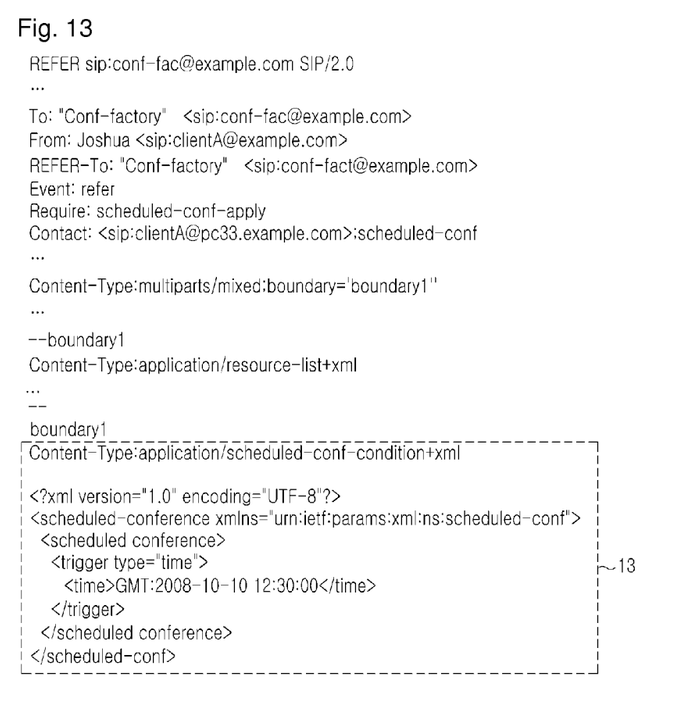
FIG. 13 is a diagram showing an example of a REFER message for an Ad-hoc group according to an embodiment of the present invention.

FIG. 8 shows a process of establishing a scheduled conference session using a REFER message in an Ad-hoc group session. Referring to FIG. 8, the client A 200 sends a REFER message to the server 220 to provide scheduled conference information in step 800. An example of the REFER message is as shown in FIG. 13. As shown in FIG. 13, the REFER message sent to the server 220 may have a group member list and scheduled conference information, which are inserted as indicated by reference numeral 13. Upon receiving the REFER message, the server 220 sends a 202 Accepted message to the client A 200 in step 805. Steps 810 to 860 are identical in operation to steps 735 to 790 in FIG. 7. However, in step 815, the server 220 may send an INVITE message to the client A 200 referring to a From header in the REFER message. Alternatively, the server 220 may send an INVITE message to the client A 200 because a URI of the client A 200 or a transmitting client is also included in a resource list of the REFER message.

As is apparent from the foregoing description, particular conditions are provided to the server for establishment of a scheduled conference session, so the user may directly set his desired conditions and establish a conference session reflecting the set conditions.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for establishing a session upon satisfaction of particular conditions for a messaging service in a server, comprising:
   receiving, by the server, a message for requesting establishment of a scheduled conference session;
   acquiring, by the server, a group member list and scheduled conference information;
   checking, by the server, whether session establishment conditions set by a transmitting client in the acquired information are satisfied, wherein the session establishment conditions include a scheduled session establishment time and presence information;
   sending, by the server, a session establish request message to at least one receiving client corresponding to the group member list when at least the scheduled session establishment time has arrived and one or more members indicated by the presence information are present; and
   sending, by the server, a Not Accepted message to suspend a connection of a current session with the server to the transmitting client, if remaining time to the scheduled session establishment time is greater than a predetermined waiting time limit.

2. The method of claim 1, wherein the message for requesting establishment of a scheduled conference session is an INVITE message or a REFER message, and includes a parameter indicating a scheduled conference.

3. The method of claim 1, further comprising:
sending by the server a session establish request message to the transmitting client which transmitted the message requesting establishment of the scheduled conference session upon satisfaction of the session establishment conditions, if the message for requesting establishment of a scheduled conference session is a REFER message.

4. The method of claim 1, wherein the step of acquiring comprises the step of:
acquiring the group member list and the scheduled conference information from a shared XML Document Management Server (XDMS).

5. The method of claim 1, wherein the step of acquiring comprises the step of:
acquiring the group member list and the scheduled conference information from the message.

6. The method of claim 1, wherein the message for requesting establishment of a scheduled conference session is an INVITE message or a REFER message, and includes a parameter indicating a scheduled conference.

7. A method for establishing a session upon satisfaction of particular conditions for a messaging service in a client terminal, comprising:
generating, by the client terminal, session establishment conditions including a scheduled session establishment time and presence information;
transmitting, by the client terminal, a message requesting a shared XML Document Management Server (XDMS) to store a group member list and the session establishment conditions;
transmitting, by the client terminal, a message for requesting establishment of a scheduled conference session to a server so that the server checks whether a current time is the scheduled session establishment time;
establishing, by the client terminal, a session with at least one receiving client terminal by receiving a message generated by the server in response to the message for requesting establishment of the scheduled conference session at the scheduled session establishment time if at least one or more members indicated by the presence information are present; and
receiving, by the client terminal, a Not Accepted message to suspend a current session with the server, if remaining time to the scheduled session establishment time is greater than a predetermined waiting time limit.

8. The method of claim 7, wherein the message for requesting the shared XDMS is an XCAP PUT command, the XCAP PUT command including the group member list and the session establishment conditions.

9. The method of claim 7, wherein the group member list and the session establishment conditions are acquired from the shared XDMS by the server.

10. The method of claim 9, wherein, when the session establishment conditions are satisfied, a session establish request message is transmitted to the at least one receiving client terminal corresponding to the group member list.

11. The method of claim 7, wherein the message for requesting establishment of a scheduled conference session is an INVITE message or a REFER message, and includes a parameter indicating a scheduled conference.

12. The method of claim 11, wherein the server determines whether the parameter indicating the scheduled conference is included in the INVITE message or the REFER message and sends an XCAP GET command requesting the session establishment conditions to the shared XDMS if the parameter indicating the scheduled conference is included.

13. A server which establishes a session upon satisfaction of particular conditions, comprising:
one or more transceivers which receive a message requesting establishment of a scheduled conference session and which transmit a session establish request message to at least one receiving client corresponding to a group member list when session establishment conditions are satisfied; and
one or more controllers which, upon receiving the requesting message, acquire the group member list and scheduled conference information, check whether session establishment conditions set by a transmitting client in the acquired information are satisfied, control the transceiver to transmit the session establish request message to the at least one receiving client corresponding to the group member list when the session establishment conditions are satisfied, and control the transceiver to send a Not Accepted message to suspend a current session with the server to the transmitting client, if remaining time to the scheduled session establishment time is greater than a predetermined waiting time limit,
wherein the session establishment conditions include a scheduled session establishment time and presence information, and
wherein the session establishment conditions are satisfied when at least the scheduled session establishment time has arrived and one or more members indicated by the presence information are present.

14. A client terminal having a messaging service, comprising:
one or more controllers which:
generate session establishment conditions including a scheduled session establishment time and presence information;
generate a message requesting a shared XML Document Management Server (XDMS) to store a group member list and the session establishment conditions;
control one or more transceivers to transmit the message to the XDMS;
generate a message requesting a server to establish a scheduled conference session;
control one or more transceivers to transmit the message to the server; and
establish a session with at least one receiving client terminal by receiving a message generated by the server in response to the message requesting establishment of the scheduled conference session at the scheduled session establishment time; and
one or more transceivers which transmit the message to the shared XDMS, transmit the message requesting establishment of the scheduled conference session to the server, receive the message generated by the server in response to the message requesting establishment of the scheduled conference session, and receive a Not Accepted message to suspend a current session with the server, if remaining time to the scheduled session establishment time is greater than a predetermined waiting time limit,
wherein the server checks whether a current time is the scheduled session establishment time and one or more members indicated by the presence information are present after receiving the message generated by the server in response to the message requesting establishment of the scheduled conference session, and wherein the session establishment conditions are satisfied when at least the scheduled session establishment time has arrived and one or more members indicated by the presence information are present.

* * * * *